United States Patent [19]

Wimmer

[11] Patent Number: 5,710,268
[45] Date of Patent: Jan. 20, 1998

[54] PROCESS FOR THE PREPARATION OF METHYLATED CYCLODEXTRIN DERIVATIVES, AND THEIR USE AS SOLUBILIZERS

[75] Inventor: Thomas Wimmer, München, Germany

[73] Assignee: Consortium für elektrochemische Industrie GmbH, Munich, Germany

[21] Appl. No.: 308,376

[22] Filed: Sep. 14, 1994

[30] Foreign Application Priority Data

Oct. 1, 1993 [DE] Germany .................. 43 33 598.5

[51] Int. Cl.$^6$ .................. C08B 37/16; C08B 37/00
[52] U.S. Cl. .................. 536/103; 536/18.6; 536/124; 514/58
[58] Field of Search .................. 514/58; 536/103, 536/18.6, 124

[56] References Cited

U.S. PATENT DOCUMENTS

| | | | |
|---|---|---|---|
| 2,827,452 | 3/1958 | Schlenk et al. | 514/58 |
| 4,542,211 | 9/1985 | Szejtli et al. | 536/103 |
| 4,746,734 | 5/1988 | Tsuchiyama et al. | 536/103 |
| 4,764,604 | 8/1988 | Müller | 536/103 |
| 4,869,904 | 9/1989 | Uekama et al. | 424/400 |
| 4,870,060 | 9/1989 | Müller | 514/58 |
| 4,956,351 | 9/1990 | Mesens et al. | 514/58 |
| 5,008,386 | 4/1991 | Szabó et al. | 536/103 |
| 5,096,893 | 3/1992 | Pitha et al. | 514/58 |

FOREIGN PATENT DOCUMENTS

| | | |
|---|---|---|
| 1300130 | 5/1992 | Canada . |
| 0193850 | 9/1986 | European Pat. Off. . |
| 0193850 | 9/1990 | European Pat. Off. . |
| 0294267 | 9/1991 | German Dem. Rep. . |
| 0869192 | 5/1961 | United Kingdom . |
| 9402516 | 2/1994 | WIPO . |

OTHER PUBLICATIONS

Szente et al. International Symposium on Cyclodextrins 1992, pp. 340–344.
Pitha et al. *J. Pharm. Sci.* 1985, 74(9), 967–990.
Ciucanu et al. *Rev. Roumaine Chim.* 1992, 37(7), 843–847.
Database WPI Week 8628, Derwent Publications Ltd. London, GB; An 178870 & JP-A-61111302 (Nippon Shokuhin Kak). May 29, 1986 & Patent Abstracts of Japan vol. 10, No. 296 (C-377) Oct. 8, 1986.
Stärke, vol. 23, No. 5, May 1, 1971, Weinheim DE, pp. 167–171 J. Lammers et al., "Properties of Cyclodextrins" p. 167.
Patent Abstracts of Japan, vol. 12, No. 219 (C-506) Jun. 22, 1988 & JP-A-63 017 895 (Wako Pure Chem Ind Ltd) Jan. 25, 1988.
Chem. Pharm. Bull. 38(2) 318–322 (1990), "Isolation and Characterization of Hexakis (2,6-di-O-methyl)cyclomaltohexaose and Octakis(2,6-di-O-methyl)cyclomalto-octaose, and their Over-methylated Homologues", Toshiko Tanimoto et al.
Life Sciences, vol. 29, pp. 307–311, 1981 Pergamon Press, "Enhanced Water Solubility of Vitamins A,D,E, and K by Substituted Cycloamyloses", Josef Pitha.
J. Szejtli, Cyclodextrin Technology, Kluwer Academic Publishers, Dordrecht 198 Boston/London, 1988, p. 53.
C.A. 108(10):77532f: "Heterogeneous methylation of cyclodextrin", J. Szejtli et al.; HU 42513, 28 Jul. 1987.
C.A. 108(24):206598h; "Partially methylated cyclodextrin", Yamamoto K. et al.; JP 63041505, 22 Feb. 1988.
C.A. 109(13): 110838f; "Methylated beta-cyclodextrin with enhanced water solubility", Imamura, T. et al., Kao Corp., Japan; JP 62 220501, 28 Sep. 1987.

*Primary Examiner*—Kathleen K. Fonda
*Attorney, Agent, or Firm*—Collard & Roe, P.C.

[57] ABSTRACT

A process in which α-, β- and/or γ-cyclodextrin are reacted in a suitable base, with a suitable O-alkylating agent and, where appropriate, following neutralization of the reaction mixture, the resulting alkylated cyclodextrin derivatives are subsequently separated, out of the reaction mixture, wherein α-, β- and/or γ-cyclodextrin are initially dissolved in a portion of the base and the O-alkylation agent and further base are added subsequently.

16 Claims, No Drawings

PROCESS FOR THE PREPARATION OF METHYLATED CYCLODEXTRIN DERIVATIVES, AND THEIR USE AS SOLUBILIZERS

BACKGROUND OF THE INVENTION

1. Field of the Invention

The present invention relates to a process for the preparation of alkylated cyclodextrin derivatives, such as methylated cyclodextrin derivatives which can be prepared by the process, and to the use of these derivatives.

2. The Prior Art

Cyclodextrins are cyclic oligosaccharides which are built up from 6, 7 or 8 α(1–4)-linked anhydroglucose units. The α-, β- or γ-cyclodextrins, which are prepared by the enzymatic conversion of starch, differ in the diameter of their cavities and are generally suitable for enclosing numerous hydrophobic guest molecules of varying size. The applications of the cyclodextrins are limited by the low solubilities of these compounds, especially that of β-cyclodextrin (1.8% w/v in water at 25° C.).

Chemical derivatization at the free hydroxyl groups represents a common method for increasing the solubility of the cyclodextrins. Suitable substituents can be introduced at the 2, 3 and/or 6 position on the individual anhydroglucose units. It is, in particular, the methylation of cyclodextrins which yields products which possess a good level of solubility both in water and in organic solvents.

Mixtures of methylated cyclodextrins are characterized by their average degree of substitution (DS value). The DS value indicates the number of substituents which are bound, on average, per anhydroglucose. The structure of the cyclodextrins is such that they can be substituted at the 2, 3 and/or 6 position.

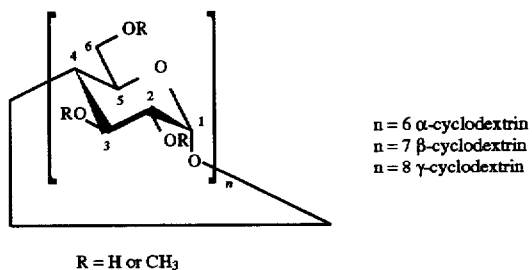

n = 6 α-cyclodextrin
n = 7 β-cyclodextrin
n = 8 γ-cyclodextrin

R = H or CH₃

The DS value can be determined, for example, by the products being hydrolyzed to their glucose units, which are then converted, by reduction and acetylation, to the D-glucitol acetates (T. Tanimoto, Y. Kubota, N. Nakanishi, K. Koizumi, Chem. Pharm. Bull. 38(2), pp 318–322 (1990)). A gas-chromatographic separation gives the molar proportions of the total of 8 theoretically possible glucose units, which are listed below, in the respective cyclodextrin derivatives.

| Number of methoxy groups | Designation | D-Glucitol acetate |
|---|---|---|
| 0 | S0 | D-Glucitol hexaacetate |
| 1 | S2 | 1,3,4,5,6-Penta-O-acetyl-2-mono-O-methyl-D-glucitol |
| 1 | S3 | 1,2,4,5,6-Penta-O-acetyl-3-mono-O-methyl-D-glucitol |
| 1 | S6 | 1,2,3,4,5-Penta-O-acetyl-6-mono-O-methyl-D-glucitol |
| 2 | S2,3 | 1,4,5,6-Tetra-O-acetyl-2,3-di-O-methyl-D-glucitol |
| 2 | S2,6 | 1,3,4,5-Tetra-O-acetyl-2,6-di-O-methyl-D-glucitol |
| 2 | S3,6 | 1,2,4,5-Tetra-O-acetyl-3,6-di-O-methyl-D-glucitol |
| 3 | S2,3,6 | 1,4,5-Tri-O-acetyl-2,3,6-tri-O-methyl-D-glucitol |

The average degree to which the individual positions are substituted can also be calculated from the mol % proportions of the respective glucose units which have been ascertained. This average probability X of a substitution in a particular position is calculated as shown below for X6 (average probability of a substitution in the O 6 position):

$$X6 = mol\% S6 + mol\% S2,6 + mol\% S3,6 + mol\% S2,3,6;$$

The average degrees of substitution for a substitution in the O2 and O3 positions can be calculated in an analogous manner.

Examples of partially methylated products which are known are hexakis-(2,6-di-O-methyl)-α-cyclodextrin, heptakis-(2,6-di-O-methyl)-β-cyclodextrin and octakis-(2,6-di-O-methyl)-γ-cyclodextrin (66% methoxy groups in each case, DS=2). These selectively substituted cyclodextrins are prepared by methylation with methyl iodide or dimethyl sulfate in organic solvents such as dimethyl sulfoxide and/or N,N-dimethylformamide in the presence of strong bases such as barium hydroxide or sodium hydroxide (see, for example, U.S. Pat. No. 4,542,211; J. Pitha, Life Sci. 29, 307–311 (1981); T. Tanimoto, Y. Kubota, N. Nakanishi, K. Koizumi, Chem. Pharm. Bull. 38(2), pp. 318–322 (1990)).

The fact that their solubility in water decreases sharply with increasing temperature (J. Szejtli in Cyclodextrin Technology, Kluwer Academic Publishers, Dordrecht/Boston/London, 1988, p. 53) represents an obstacle to the widespread use of these selectively methylated cyclodextrin derivatives for industrial purposes, as does the fact that their synthesis and purification are complex.

The preparation of a methylated γ-cyclodextrin having a DS value of 1.49 at 120° C. in a 1,2-dimethoxyethane/water mixture containing a 100-fold molar quantity of methyl chloride is described in U.S. Pat. No. 4,764,604 and also in U.S. Pat. No. 4,870,060.

Pat. DD 294 267 describes mixtures of highly methylated cyclodextrins having a melting point of <100° C. which were obtained by methylating in an organic solvent.

Methylated α-, β-, or γ-cyclodextrins are likewise prepared in organic solvents, such as, for example, tetrahydrofuran, with dimethyl sulfate using phase-transfer catalysis (CA 108(10): 77532f).

In preparing cyclodextrin derivatives, it is desirable, for toxicological and ecological reasons, to avoid the use of organic solvents, as employed for preparing the derivatives in the prior art documents.

The solubility in water of all cyclodextrin derivatives hitherto described decreases with increasing temperature.

The Patent EP-B1-0193580 discloses mixtures of partially methylated cyclodextrins whose solubility in water increases with increasing temperature. The maximum water solubility of the product is from 130 to 133 g/100 ml of $H_2O$ at 25° C. and about 160 g/100 ml of $H_2O$ at 70° C. In order to prepare them, β-cyclodextrin is methylated in aqueous sodium hydroxide solution with at least 30, preferably 100–200, molar equivalents of dimethyl sulfate. The resulting product is methylated to an extent of at least 90% in the 2 position, to an extent of 25–33% in the 3 position, and to an extent of at least 95% in the 6 position.

Similar methylation processes are described in CA 108 (24): 206598h and CA 109(13): 110838f.

The enormous excesses of carcinogenic dimethyl sulfate employed, especially in the last-named prior art, have a negative effect on the economy of the processes.

SUMMARY OF THE INVENTION

It is an object of the present invention to provide an economical process for preparing alkylated cyclodextrin derivatives.

It is an additional object of the invention to provide methylated cyclodextrin derivatives which can be prepared by the process according to the invention, which derivatives have a very good level of solubility in water, and which have improved properties as compared with known methylated cyclodextrins.

The above objects are achieved by a process in which α, β-and/or γ-cyclodextrins are reacted, in a suitable base, with a suitable O-alkylating agent and, where appropriate, following neutralization of the reaction mixture, the resulting alkylated cyclodextrin derivatives are subsequently separated, in a manner known per se, out of the reaction mixture, wherein α-, β- and/or γ-cyclodextrins are initially dissolved in a portion of the base and the O-alkylating agent and further base are subsequently added.

Commercially available α, β- and/or γ-cyclodextrins can be employed in the process according to the invention. However, the cyclodextrins can also be prepared in a manner known per se, for example by the enzymic conversion of starch using cyclodextrin glycosyltransferase (CGTase E.C.2.4.1.19).

Examples of suitable bases are alkali metal hydroxides or alkaline earth metal hydroxides or their mixtures. The use of alkali metal hydroxides is preferred.

Potassium hydroxide and/or sodium hydroxide are preferably used as the alkali metal hydroxide, with sodium hydroxide being particularly preferred.

$C_1$-$C_2$-Alkyl chlorides, $C_1$-$C_6$-alkyl bromides, $C_1$-$C_6$-alkyl iodides, dialkyl sulfates, α-chlorocarboxylic acids and their salts, epichlorohydrin, and also compounds of the general formula

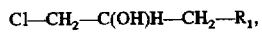

Cl—$CH_2$—C(OH)H—$CH_2$—$R_1$, where $R_1$ is $N^+R_3^2$ or $SO_3^-$, and $R^2$ is a $C_1$-$C_3$-alkyl radical, are preferably used as the O-alkylating agent.

Methyl chloride, dimethyl sulfate, 3-chloro-2-hydroxypropyltrimethylammonium chloride, chloroacetic acid and its sodium salt, and epichlorohydrin are preferably used.

Methyl chloride, epichlorohydrin and sodium chloroacetate are particularly preferably used.

15–25 mol, preferably 17–21 mol, of the suitable base and 15–25 mol, preferably 17–21 mol, of the O-alkylating agent are preferably employed per mole of cyclodextrin.

The preferably total quantity of cyclodextrin is dissolved in an aqueous solution of the base having a concentration of 5–20% (w/w), preferably 8–12% (w/w), and at a quantity of 1–5 mol, preferably 2–3 mol, of the base employed per mole of cyclodextrin.

Preferably, the remaining quantity of base is subsequently metered in at the same time as the O-alkylating agent. The O-alkylating agent and the base are metered in in aliquots or continuously, continuous metering-in being preferred.

The continuous metering-in is preferably carried out over a period of time amounting to up to ⅔ of the total reaction time.

The base which is preferably metered in at the same time as the O-alkylating agent is added as a solid or as an aqueous solution. An aqueous solution of a concentration of 20–60% is preferably employed. A 50% aqueous solution (w/w) is particularly suitable.

After the reaction is complete, excess O-alkylating agent can readily be removed in a manner known per se, for example by applying a vacuum (10–100 mm $H_2O$).

The reaction is carried out preferably at a temperature of 50°–100° C., particularly preferably at 60°–80° C., and under a pressure of 2–10 bar, in particular at 4–6 bar, once the cyclodextrin has dissolved. The duration of the reaction depends on the temperature. It is about 5–30 h. Normally, the reaction is complete after about 10–15 h.

Once the reaction is complete, the neutral to slightly alkaline solution is, if necessary, neutralized by adding acid. Mineral acids, in particular phosphoric, sulfuric and/or hydrochloric acid are particularly suitable for this purpose. Hydrochloric acid having a concentration of from 5 to 25% (w/w) is particularly suitable.

As compared with known processes, the process according to the invention possesses the advantage that no organic solvents are employed. A further advantage of the process according to the invention is that substantially lower quantities of base and O-alkylating agent need to be employed in order to achieve a particular average degree of alkylation of the product.

The resulting cyclodextrin derivatives are separated from inorganic salts in a manner known per se. Examples of known methods are ion-exchange chromatography (see, for example, U.S. Pat. No. 4,764,604) or extraction with an organic solvent such as methylene chloride or chloroform.

If desired, the cyclodextrin derivatives are further purified using methods which are known per se, such as, for example, decolorization with active charcoal, or adsorption chromatography on active charcoal, silica gel or aluminum hydroxide.

Those mixtures of alkylated cyclodextrins obtained by the process according to the invention are characterized, for example, by their average degree of substitution (DS value).

Surprisingly, when α-, β- and/or γ-cyclodextrin are reacted with methyl chloride in aqueous alkali metal solution, in accordance with the process according to the invention, only methylated cyclodextrin derivatives are obtained which have a DS value of between 1.7 and 1.95 and whose O6 position is methylated to the extent of from 55 to 75%.

The additional object of the invention is achieved by methylated cyclodextrin derivatives whose average degree of substitution (DS), measured by means of $^1$H-NMR spectroscopy, is between 1.7 and 1.95 and whose O6 position is methylated to the extent of from 55 to 75%.

Methyl-β-cyclodextrins and methyl-γ-cyclodextrins are particularly preferred which have an average degree of substitution (DS), measured by means of $^1$H-NMR spectroscopy, of between 1.7 and 1.9 and whose O2 and O6 positions are methylated on average to the extent of from 60 to 70%, as is methyl-α-cyclodextrin having an average degree of substitution (DS), measured by means of $^1$H-NMR spectroscopy, of between 1.7 and 1.9 and having an average degree of methylation of the O2 position of from 70 to 80% and having an average degree of methylation of the O6 position of from 60 to 70%.

More than 200 g of the cyclodextrin derivatives according to the invention can be dissolved in 100 ml of water over a temperature range of from 20° to 100° C. Moreover, the solubility of the cyclodextrin derivatives according to the invention in water increases with increasing temperature to values of up to 250 g/100 ml of $H_2O$. These cyclodextrin derivatives are thus considerably more soluble in water than are known methylated cyclodextrin derivatives. The cyclodextrin derivatives according to the invention furthermore possess the advantage of having an increased capacity for solubilizing substances, such as, for example, steroids, which are difficult to dissolve in water.

The cyclodextrin derivatives mentioned as being preferred and particularly preferred possess the best solubility and the maximum solubilizing capacity. Moreover, they are, as a rule, best suited for the uses mentioned below.

The cyclodextrin derivatives obtained by the process according to the invention are suitable for all known uses of cyclodextrins and cyclodextrin derivatives.

The methylated cyclodextrin derivatives according to the invention are particularly suitable:

- for solubilizing compounds, such as, for example, steroids, which are difficult to dissolve in water;
- as a formulation auxiliary in pharmaceutical, cosmetic and agrochemical products;
- for the stabilization of substances which are sensitive to light or oxidation;
- for degreasing and cleaning any surface whatever;
- for replacing organic solvents, in particular in the separation and extraction of substances from lipophilic media;
- as auxiliary substances, in particular for coating and/or adhesion promotion in the paper, leather and textile industries;
- as phase-transfer catalysts; and
- for masking taste and smell.

Other objects and features of the present invention will become apparent from the following examples which disclose the embodiments of the present invention. It should be understood, however, that the examples are designed for the purpose of illustration only and not as a definition of the limits of the invention.

DETAILED DESCRIPTION OF PREFERRED EMBODIMENTS

EXAMPLE 1

Preparation of methyl-β-cyclodextrin 12.5 kg of moist β-cyclodextrin (9% water, 10 mol) (obtainable commercially from Wacker-Chemie, 81737 Munich; under the designation BETA W7) were dissolved in 10 kg of a 10% aqueous solution of sodium hydroxide in a pressure-resistant 100 l mixing vessel. The reaction mixture was heated to 80° C. and 9.8 kg of methyl chloride were metered in continuously over a period of 7 h up to a pressure of about 5 bar. At the same time, 13 kg of a 50% solution of sodium hydroxide were added during the course of 7 h. After 12 h, the mixture was neutralized with 15% (w/w) hydrochloric acid and the product was extracted into 30 kg of chloroform. Once the phases had been separated, the organic phase was separated and the solvent distilled off under standard pressure.

Yield: approximately 12 kg of methyl-β-cyclodextrin (substituent distribution, see Table 1).

Solubility: 200 g/100 ml of water at 25° C., >200 g/100 ml of water at 80° C.

DS ascertained using $^1$H-NMR spectroscopy: 1.74

EXAMPLE 2

Preparation of methyl-γ-cyclodextrin

Methyl-γ-cyclodextrin was prepared as described in Example 1 with γ-cyclodextrin (obtainable commercially from Wacker-Chemie; 81737 Munich under the designation GAMMA W8) being employed in place of the β-cyclodextrin and the reaction being carried out at a temperature of 60° C.

Yield: approximately 11 kg of methyl-γ-cyclodextrin (substituent distribution, see Table 1).

Solubility: 200 g/100 ml of water at 25° C., >200 g/100 ml of water at 80° C.

DS ascertained using $^1$H-NMR spectroscopy: 1.78.

EXAMPLE 3

Preparation of methyl-α-cyclodextrin

Methyl-α-cyclodextrin was prepared as described in Example 1 with α-cyclodextrin (obtainable commercially from Wacker-Chemie; 81737 Munich under the designation ALPHAW6) being employed in place of the β-cyclodextrin and the reaction being carried out at a temperature of 70° C.

Yield: approximately 12 kg of methyl-α-cyclodextrin (substituent composition, see Table 1).

Solubility: 200 g/100 ml of water at 25° C., >200 g/100 ml of water at 80° C.

DS ascertained using $^1$H-NMR spectroscopy: 1.76.

COMPARATIVE EXAMPLE 1

Preparation of methyl-β-cyclodextrin without metering in alkaline solution 7.2 kg of β-cyclodextrin (13% water) (obtainable commercially from Wacker-Chemie; 81737 Munich under the designation BETA W7) were dissolved in a solution of 6.0 kg of sodium hydroxide in 12 kg of water, and the mixture was heated in an autoclave to 60° C. 7.2 kg of methyl chloride were metered in over 28 hours under a pressure of at most 7 bar and at a reaction temperature of 60° C. The mixture was neutralized with 10% sulfuric acid and the product was extracted with 18 kg of methylene chloride. The organic phase, which contains the salt-free product, was separated in a separating funnel. The solvent was distilled off. The solid residue was dissolved in 15 kg of water and the aqueous solution was spray-dried.

6.8 kg of methyl-β-cyclodextrin were obtained.

The substituent distribution is listed in Table 1 and the DS value, ascertained using $^1$H-NMR spectroscopy, was 1.75.

COMPARATIVE EXAMPLE 2

Partially methylated β-cyclodextrins were prepared as described in EP-0193850, Example 1. At 25° C., these β-cyclodextrins have a solubility of approximately 133 g/100 ml of water. The substituent distribution is listed in Table 1 and the DS value, ascertained using $^1$H-NMR spectroscopy, was 2.21.

EXAMPLE 4

Determination of the substituent distribution 2 mg of the methylated cyclodextrin from each of Examples 1 to 3, as well as from Comparative Example 2, were hydrolyzed at 110° C. for 4 hours with 4 ml of a 2M solution of trifluoroacetic acid. The solution was brought to dryness and heated at 60° C. for 1 hour together with 0.25 ml of a 0.5M solution of NaBH$_4$ in 1.5M ammonia. The excess of the reducing agent was destroyed with glacial acetic acid and the resulting boric acid removed by fuming off with methanol. The residue was acetylated in pyridine using acetic anhydride. Once hydrolysis had been carried out using 2 ml of a saturated solution of sodium hydrogen carbonate, the mixture was extracted into chloroform and the extract was fractionated by gas chromatography. The assignment of the eight possible glucitol acetates was validated by GC-MS coupling. The evaluation of the peak areas gives the substituent distribution (Table 1).

TABLE 1

| EX | Substituent distribution, values in mol % | | | | | | | | | |
|---|---|---|---|---|---|---|---|---|---|---|
|  | S0 | S2 | S3 | S6 | S2,3 | S2,6 | S3,6 | S2,3,6 | X6 | X2 |
| 1 | 6.8 | 15.8 | 5.2 | 13.4 | 8.1 | 24.4 | 11.0 | 15.3 | 64.1 | 63.6 |
| 2 | 6.4 | 13.0 | 6.1 | 12.7 | 7.1 | 25.9 | 12.1 | 16.7 | 67.4 | 62.7 |
| 3 | 10.7 | 21.7 | 1.4 | 10.5 | 5.1 | 38.6 | 2.2 | 9.8 | 61.1 | 75.2 |
| Com 1 | 6.0 | 7.5 | 4.6 | 19.9 | 4.4 | 26.8 | 14.5 | 16.3 | 77.5 | 55.0 |
| Com 2 | 0.5 | 0.6 | 0.3 | 21.3 | 0.4 | 35.4 | 15.8 | 25.7 | 98.2 | 62.1 |

EXAMPLE 5

Determination of the solubilization capacity

10% (w/w) aqueous solutions of methyl-β-cyclodextrin from Example 1 and Comparative Example 1 were shaken, at 25° C. for 24 h, with an excess of hydrocortisone. Undissolved hydrocortisone was separated off by filtration using a membrane filter (0.2 μm). The concentration of hydrocortisone in the filtrate was determined by means of HPLC. 17 mg of hydrocortisone could be solubilized per ml of 10% aqueous CD solution when the methyl-β-cyclodextrin from Example 1 was used, and 14.1 mg of hydrocortisone could be solubilized per ml of 10% aqueous CD solution when the methyl-β-cyclodextrin from Comparative Example 1 was used.

While several embodiments of the present invention have been shown and described, it is to be understood that many changes and modifications may be made thereunto without departing from the spirit and scope of the invention as defined in the appended claims.

What is claimed is:

1. A process for the preparation of a methylated cyclodextrin selected from the group consisting of a methylated α-cyclodextrin, a methylated β-cyclodextrin, a methylated γ-cyclodextrin and the mixtures thereof, which process has a total reaction time of about 5–30 hours, comprising initially dissolving an α-, β-, or γ-cyclodextrin or mixture thereof in a portion of a base and subsequently adding methyl chloride as an O-alkylation agent and additional base simultaneously and continuously during a period of time up to two-thirds of the total reaction time;

reacting the α-, β-, or γ-cyclodextrin or mixture thereof in said base with said methyl chloride O-alkylating agent to produce a reaction mixture; and separating the resulting methylated cyclodextrin derivatives out of the reaction mixture.

2. A process for the preparation of a methylated cyclodextrin selected from the group consisting of a methylated α-cyclodextrin, a methylated β-cyclodextrin, a methylated γ-cyclodextrin and the mixtures thereof, which process has a total reaction time of about 5–30 hours, comprising initially dissolving an α-cyclodextrin, a β-cyclodextrin, or a γ-cyclodextrin or mixture thereof in from 1 to 5 mol portion of an aqueous solution of a base in a concentration of 5–20% (w/w) per mol of cyclodextrin, and from 15 to 25 mol of methyl chloride as an O-alkylating agent, up to a maximum base concentration of from 15 to 25 mol per mol of cyclodextrin;

subsequently adding additional base and said methyl chloride O-alkylating agent simultaneously and continuously during a period of time up to two-thirds of the total reaction time;

reacting the α-cyclodextrin, β-cyclodextrin or γ-cyclodextrin in said base with said methyl chloride O-alkylating agent to produce a reaction mixture; and separating the resulting methylated cyclodextrin derivatives out of the reaction mixture.

3. The process as Claimed in claim 1, comprising adding the O-alkylating agent and the additional base simultaneously and continuously.

4. The process as claimed in claim 1, wherein said base is selected from the group consisting of potassium hydroxide and sodium hydroxide.

5. Methyl cyclodextrin having an average degree of substitution (DS), measured by means of $^1$H-NMR spectroscopy, between 1.7 and 1.9 and the O6 position is methylated to the extent of from 55 to 75%.

6. Methyl-β-cyclodextrin having an average degree of substitution (DS), measured by means of $^1$-NMR spectroscopy, between 1.7 and 1.9 and having an average degree of methylation of the O2 and O6 positions of from 60 to 70%.

7. Methyl-γ-cyclodextrin having an average degree of substitution (DS), measured by means of $^1$H-NMR spectroscopy, of between 1.7 and 1.9 and having an average degree of methylation of the O2 and the O6 positions of from 60 to 70%.

8. Methyl-α-cyclodextrin having an average degree of substitution (DS), measured by means of $^1$H-NMR spectroscopy, of between 1.7 and 1.9 and having an average degree of methylation of the O2 position of from 70 to 80% and having an average degree of methylation of the O6 position of from 60 to 70%.

9. In a method for solubilizing substances which are difficult to dissolve in water, the improvement comprising utilizing the methylated cyclodextrin derivatives of claim 5 for solubilizing said difficult to dissolve substances.

10. In a method for solubilizing substances which are difficult to dissolve in water, the improvement comprising
utilizing the methyl-β-cyclodextrin of claim 6 for solubilizing said difficult to dissolve substances.

11. In a method for solubilizing substances which are difficult to dissolve in water, the improvement comprising
utilizing the methyl-γ-cyclodextrin of claim 7 for solubilizing said difficult to dissolve substances.

12. In a method for solubilizing substances which are difficult to dissolve in water, the improvement comprising
utilizing the methyl-α-cyclodextrin of claim 8 for solubilizing said difficult to dissolve substances.

13. The process as claimed in claim 1,
wherein more than 200 g of said cyclodextrin derivatives are dissolvable in 100 ml of water over a temperature range of from 20° to 100° C.

14. The process as claimed in claim 2,
wherein more than 200 g of said cyclodextrin derivatives are dissolvable in 100 ml of water over a temperature range of from 20° to 100° C.

15. The process as claimed in claim 1,
wherein the solubility of the cyclodextrin derivatives in water increases with increasing temperature up to 250 g/100 ml of $H_2O$.

16. The process as claimed in claim 2,
wherein the solubility of the cyclodextrin derivatives in water increases with increasing temperature up to 250 g/100 ml of $H_2O$.

* * * * *